United States Patent Office 3,124,468
Patented Mar. 10, 1964

3,124,468
METHOD OF TREATING SKINNED ANIMAL CARCASSES
Beverly E. Williams, La Grange Park, Ill., assignor, by mesne assignments, to Hodges Development Corporation, New York, N.Y., a corporation of Delaware
No Drawing. Filed Mar. 15, 1960, Ser. No. 15,070
9 Claims. (Cl. 99—174)

This invention relates to treatment of edible animal carcasses, and more particularly, provides a novel method and product for prolonging the time during which edible animal carcasses remain in marketable condition.

While edible animal carcasses are being held in storage or transported, the surfaces of the carcass are exposed to infection by air-borne microorganisms. The microorganisms find a favorable environment for their growth and development on the carcass surfaces. Putrefactive bacteria will produce spoilage of the meat eventually. However, even before spoilage occurs, microorganisms may affect the surface of the carcass so as to render it objectionable. Microorganisms which are noxious and detract from the acceptability of edible animal carcasses include both molds (fungi) and bacteria. A class of microorganisms which are particularly noxious in this respect are the gas-forming, odor-producing bacteria. These odor-producing bacteria are frequently anaerobic, and therefore when animal carcasses are wrapped during storage and shipment, so that air is excluded from the carcass surface, the conditions at the carcass surface are particularly favorable for the development of such noxious, odor-producing bacteria.

The presence of odor is also particularly noticeable when animal carcasses have been encased in a wrap. The confined area between the surface of the carcass and the wrap and the wrap itself will trap and retain odors, thus accentuating the extent to which any odor which is present will be noticed.

There are many advantages to be gained by keeping edible animal carcasses wrapped from the time when the animal is slaughtered to the time when the carcass is sold, particularly where the carcass is to be shipped over long distances. Carcasses which are not wrapped undergo weight losses during storage and shipment, principally due to loss of moisture. The meat is also discolored and dried at surfaces exposed to the air, and this necessitates trimming losses. Wrapping can minimize these losses. Beef carcasses have a thick layer of firm, solid fat on their outer surfaces, which has some effectiveness as a protective coating therefor. The carcasses of other meat animals like lamb and veal, however, lack such a fat layer, and particularly benefit from enclosure in a wrap.

A wrap has been developed which has gained substantial commercial acceptance, especially for wrapping lamb and veal carcasses. Essentially this wrap consists of a cloth or other absorbent material, covered with a moisture-permeable plastic coating. The plastic is a barrier to access of air to the carcass surface and minimizes loss of moisture from the meat. The cloth wicks up moisture present on the surface of the carcass, and distributes this moisture evenly over the surface of the carcass, thus preventing the formation of slime under the wrap. The problem of complaints of off-condition consisting of odor development has arisen particularly in connection with the use of this wrap on veal and lamb carcasses. The manifold advantages of the use of the stated wrap make it particularly desirable to devise a method for obviating the odor problem.

It is an object of this invention to provide a method for reducing the development of odor on animal carcass surfaces.

A particular object of this invention is to provide a novel method of wrapping animal carcasses whereby the development of obnoxious microorganisms in the wrap and in the surface of the carcass directly under and covered by the wrap is inhibited.

A further object is to provide a novel method of wrapping animal carcasses, including veal and lamb carcasses, whereby the development of odor-forming bacteria in the wrap and in the surface of the carcass directly in contact with the wrap is inhibited.

Another object of this invention is to provide a novel and improved method of wrapping animal carcasses employing a meat wrap comprising a plastic-covered cloth.

These and other objects, including the provision of a novel meat wrap in which animal carcasses may be wrapped and kept without development of odor, will become evident from a consideration of the following specification and claims.

The method of this invention, broadly stated, comprises positioning and maintaining an antibiotic in moisture transfer contact relationship with the exterior surface of an edible animal carcass.

More particularly, the present invention provides a method for inhibiting the development of obnoxious microorganisms comprising odor-forming bacteria at the surface of a wrapped edible animal carcass which comprises applying a wrap to the exterior surface of an edible animal carcass and positioning and maintaining an antibiotic in moisture transfer contact relationship with said exterior surface of an edible animal carcass to which said wrap is applied.

A specific procedure in which the method of this invention is conveniently practiced to effect inhibition of odor formation using a wrap like the plastic-coated wrap discussed above comprises applying a wrap moistened with an aqueous solution of an antibiotic to the exterior surface of an edible animal carcass. Such edible animal carcass wraps moistened with an aqueous solution of an antibiotic are novel products provided by this invention which are particularly adapted to the practice of the presently provided method.

This invention offers many and important advantages to the meat packing industry. The presently provided method maintains edible animal carcasses in good marketable condition for periods substantially more prolonged than has been possible hitherto. It substantially obviates the growth of objectionable microorganisms on edible animal carcass surfaces. A particularly advantageous feature of this invention is that it obviates the problem of complaints of off-condition, particularly off-condition due to odor, when edible animal carcasses are protected from losses during shipment by application of wraps thereto, including especially plastic-coated wraps effective to act as air and moisture barriers.

The discovery has been made that the way in which the plastic-coated cloth carcass wraps have been applied to edible animal carcasses hitherto has actually promoted odor formation. The plastic-coated wraps are moistened before they are applied to the carcass. They may be moistened with water. Usually, however, they have been moistened with an aqueous brine solution. Brine solutions are customarily available on the floors of slaughtering houses in the United States, for use in wetting beef shrouds. The shroud is a cotton or ramie cloth which is wet with the brine and then applied to the skinned beef carcass before the carcass is put in the cooler. It is removed in about 24 hours, after the carcass has lost its body heat and cooled to the temperature of its surroundings. The brine baths used to wet the beef shrouds generally range in concentration from about 5° to about 20° salometer at 60° F. It is this type of brine bath which has generally been used to moisten the plastic-coated carcass wraps before they are applied to animal carcasses.

The function traditionally ascribed to the brime in the meat packing industry is that of inhibiting the growth of microorganisms. It is true that concentrated brine can inhibit the development of some microorganisms. However, the maximum concentration permitted for fresh meat under government regulations, as used to wet beef shrouds, is 20° salometer. It has been found that such brine solutions, used to moisten the plastic-coated cloth wraps referred to, do not prevent or inhibit the growth of obnoxious microorganisms within the wrap or on the surface of the carcass adjacent to the wrap. On the contrary, the brine promotes the growth of the microorganisms. Because salt is hygroscopic, brine will attract and retain moisture. It has been found that the use of brine to moisten the plastic-coated carcass wraps thus actually increases the moistness of the environment between the wrap and the carcass, by its hygroscopicity. This favors and promotes the growth of microorganisms in the stated environment. Since the plastic-coated wrap is designed to act as an air barrier in view of the undesirable effect of contact with air on the carcass, this environment is, moreover, substantially anaerobic, and the odor-forming, gas-producing anaerobic bacterial are consequently provided with optimum conditions for their growth and development.

The method provided by this invention, in contrast to the above-stated situation encountered when brine is used to moisten the plastic-coated wrap, is entirely successful in suppressing odor formation. Whereas the environment at the carcass-wrap interface is such that the brine cannot control, and indeed, aggravates the problem of microorganism growth, provision of an antibiotic in moisture transfer contact relationship with the carcass surface in accordance with this invention is found to effect substantially complete inhibition of the development of obnoxious microorganisms present at carcass surfaces, including particularly odor-forming, anaerobic bacteria.

Moreover, the invention meets essential requirements for a method which is to be practiced in the treatment of foods intended for human consumption. It is of course a requisite in this connection that any substance brought into contact with such foods be innocuous to man and non-toxic to foods. Only a limited number of chemicals which inhibit microorganism growth have these qualities. The antibiotics employed in the presently provided method not only meet these requirements, but are indeed known to be beneficial to man. Moreover, they have the further important property of being substantially free of odor or taste in the concentration used, so that they do not affect the taste of the carcass to which they are applied or themselves impart an odor to the wrap or carcass. Additionally, they are substantially water-soluble, which facilitates their utilization.

Moreover, the growth of a variety of noxious microorganisms, including putrefactive bacterial and sometimes fungi, as well as the odor-forming bacteria, is inhibited by the method of the invention.

Antibiotics are chemical substances which are usually defined as chemical substances produced by living microorganisms and which have the capacity in dilute solution of interfering with life processes of other microorganisms so as to prevent their multiplication or cause their destruction. In present practice in the industry, however, the term "antibiotics" is also used to designate chemical substances produced by synthetic methods which are identical with or closely related to the natural product of living microorganisms. A very large number of antibiotics have been isolated. Of these, those which have become of some commercial importance include penicillin (including the entire group of natural, synthetic and semisynthetic penicillins of varying specific structure), streptomycin and dihydrostreptomycin, tetracycline, chlortetracycline and oxytetracycline, chloramphenicol, neomycin, bacitracin, polymyxin, erythromycin, fumigallin, tyrothricin, and a few others. Some of the more recently developed antibiotics, which are unusual in having broad-spectrum antifungal activity, as distinguished from antibacterial activity, include, for example, tennecetin, nystatin, and so forth. While the several antibiotics which have been mentioned are substantially all suitable for use in medicine for the treatment of human beings, they are not all adapted for oral ingestion. The antibiotics useful in the present connection will preferably be adapted for oral ingestion, although, as will appear hereinafter, the antibiotic will usually be destroyed in any case when the meat is cooked. Additionally, for use in practicing the method of this invention, the antibiotic should be one exhibiting a broad spectrum antibacterial action. While a number of antibiotics are available which can be used for the present purposes, the particularly preferred type comprises the tetracyclines. This group includes tetracycline and also chlortetracycline and oxytetracycline. Chlortetracycline and oxytetracycline, particularly oxytetracycline, are especially preferred. These antibiotics have a broad spectrum of antibacterial activity, being effective against both gram-positive and gram-negative bacteria, aerobic and anaerobic, such as Salmonella, Micrococci and Clostridia.

The tetracyclines are closely congeneric derivatives of the polycyclic naphthacene-carboxamide. The sensitivity or resistance of a particular microorganism to the three congeners is quite similar. Their structural formulas are as follows:

(1) Chlortetracycline

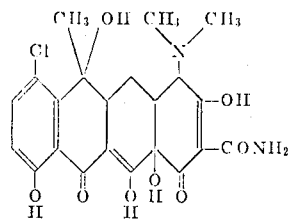

(2) Tetracycline

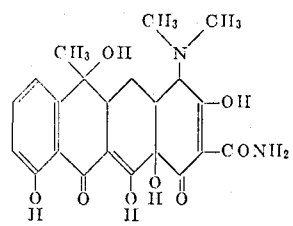

(3) Oxytetracycline

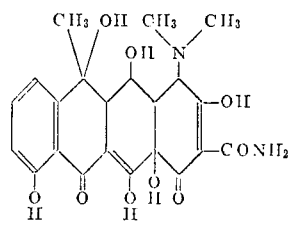

The crystalline bases are faintly yellow, odorless, slightly bitter compounds. They are only slightly soluble in water at pH 7 (0.25 to 0.5 mgm. per milliliter), but they form soluble sodium salts and hydrochlorides. Instability of solutions of all the tetracyclines increases with pH and temperature. At the temperatures used in cooking, these antibiotics will decompose with relative ease. The bases and the hydrochlorides are stable indefinitely as dry powders. The antibiotics may be used in any of their known, antibacterially active forms, such as the base or acid per se, or salts. For instance, the tetracycline antibiotics (oxytetracycline, chlortetracycline and tetracycline) may be used as the free, amphoteric compounds, as the hydrochlorides, sulfates and other acid salts, or as the sodium, potassium and other metal salts.

For the practice of the method of this invention, the antibiotic will be employed as a dilute aqueous solution. The concentration to be used will vary widely, depending in part on the selected antibiotic, and in part on how the solution is applied. For oxytetracycline, which is the preferred antibiotic in the practice of the method of this invention, a concentration ranging from about 10 to about 500 parts per million may be used. A concentration of 100 parts per million of oxytetracycline has been found particularly suitable for the practice of this invention.

The solubility of oxytetracycline will generally be enhanced by converting it to a salt thereof such as the hydrochloride. It may, if desired, be combined with other chemical compounds which have a favorable effect on its solubility. Thus, for example, a preparation containing oxytetracycline in combination with citric acid may be used. The citric acid has a favorable effect in solubilizing the oxytetracycline and protects it by chelating some of the metal ions such as calcium which may be present in the water supply.

Since antibiotics are not necessarily pure chemical compounds, but may be the product of living microorganisms, their effectiveness sometimes varies depending on the source of the material. Accordingly antibiotics are frequently identified by reference to their potency. The oxytetracycline hydrochloride referred to above is designated as having a potency of approximately 795 mcg./g. It is a product of this potency which is referred to above in designating the concentration ranges and preferred concentration of oxytetracycline which may be used in the practice of this invention. Where products are used which have a different potency or which comprise the antibiotic in combination with another material such as brine, sodium hypochlorite, citric acid or the like, the concentration of the product used will be adjusted accordingly to obtain an appropriate concentration equivalent to from about 10 to about 500 p.p.m., and preferably about 100 parts per million of oxytetracycline hydrochloride having a potency of approximately 795 mcg./g.

In general, antibiotics of the tetracycline type, while they are highly active against a wide spectrum of bacteria, are not particularly effective in the control of the growth of fungi. Fungi or molds, while capable of growing on the surface of meat, do not present as acute a problem in wrapping animal carcasses as do the bacteria such as the odor-forming and putrefactive bacteria. Nevertheless, difficulties with the growth of these microorganisms may be encountered. Some of the newer antibiotics are themselves antifungal, such as tennecetin and nystatin, and suitable antifungal antibiotics may be used if desired in practicing the method of this invention, in conjunction with a wide-spectrum antibacterial antibiotic. Alternatively, where it is desired to incorporate a fungicide or fungistat into the aqueous solution of an antibiotic such as the tetracycline-type antibiotics, antifungal compounds which are not antibiotics may be used. Preferred compounds for use in this connection comprise sorbic acid and salts of sorbic acid, particularly readily water-soluble salts such as sodium or potassium sorbate, and especially potassium sorbate. In general, effective control of fungi and molds may be produced using relatively low concentrations such as from about 500 parts per million to about 1.0% of potassium sorbate in the aqueous solution. A concentration of 0.1% by weight of potassium sorbate has been found to give satisfactory results.

It is also possible for the aqueous solution of the antibiotic to contain additional components. In particular, the solution may comprise a brine. As mentioned above, brines are hygroscopic and may cause an increase in the amount of moisture present under a carcass wrap, between the wrap and the carcass, when the air to which the wrapped carcass is exposed is of a relatively high humidity. However, it has been found that the antibiotics employed in the method of this invention are able to control the development of bacteria even where this occurs. It may be convenient for meat packers to employ a brine solution as the medium for dissolving the antibiotic, where the tanks available on meat slaughtering floors already contain brine, as prepared for use to wet conventional meat shrouds, particularly overnight beef shrouds. Thus this invention includes utilization of sodium chloride, particularly in the concentrations used in the brines employed for wetting beef shrouds in the meat packing industry, in addition to the antibiotic, and optionally, solubilizers for the antibiotic and fungicides or fungistats which complement the action of the antibiotic. Usually the brines will have a concentration equivalent to a 5 to 20° salometer reading at 60° F.

It is to be understood that when reference is made herein to a solution of an antibiotic, it refers to solutions as described above, including optionally brine, solubilizers like citric acid, fungicides like sorbic acid, and so forth.

A carcass wrap comprising a plastic-coated absorbent material is applied to the animal carcass in conjunction with provision of an antibiotic in accordance with this invention, in an embodiment of the present invention offering particular advantages. With this kind of wrap, the edible animal carcass is protected from the access of air to a maximum extent, the surface of the carcass is kept in moist condition, and losses from dehydration of the carcass are minimized. Hermetic sealing of carcasses other than frozen carcasses, however, will cause slime to develop on the surface of the carcass, and the wrap contemplated accordingly is characterized by the property of moisture vapor permeability.

The plastic-coated carcass wrap which is preferred for use in the method of the present invention is the product described in U.S. Patent 2,699,396. This is a unitary product comprising an absorbent material and a substantially continuous, moisture vapor permeable, pliable, extensile organic film, preferably a synthetic resinous plastic film. The film will be substantially odorless and tasteless and will be water resistant. The moisture vapor permeability is provided by suitable formulation of the plastic of the product and by minute perforations or pinholes in the film. The wrap may, for example, have a moisture vapor permeability of about 0.25–2.75 g. per 50 square centimeters per 24 hours at room temperature and 100% relative humidity, as measured by the Technical Association of the Pulp and Paper Industry method T448–M–46; or a vapor transmission rate of about 15–70 g. of 85–95% relative humidity at 99° F. to a dry atmosphere (measured by the method described in U.S. Patent 2,697,664). The absorbent material portion of the wrap may vary widely in nature, comprising fibers such as cotton, ramie, jute, rayon, paper or the like, and taking the form of woven, knitted, netted or non-woven fabric such as felt, web, bat, paper or the like. Usually it will be a woven fabric, and generally a rather light fabric, such as a fabric of conventional weave construction weighing between 1 and 9 square yards to the pound and preferably 3 to 7 square yards to the pound. Cotton is a suitable fiber. The plastic film combined with the absorbent material to make the unitary wrap may also be formed from any of a wide variety of plastics. Thus, for example, it may be a copolymer of polyvinyl chloride and polyvinyl acetate or of polyvinyl chloride and polyvinylidene chloride. Usually the resin will be plasticized, with a plasticizer such as bis(2-ethylhexyl)phthalate, for example, to increase its flexibility; and advantageously, the resin formulation will also include a stabilizer. The weight of the plastic coating applied to the fabric will generally range from about 0.1 to about 3.0 ounces per square yard, and more particularly, from about 1.0 to about 1.5 ounces per square yard, with the higher weights being used on heavier fabrics in a tighter or less porous coating. Details of the preparation of wraps of the stated nature and permissible variances may be obtained by reference, for example, to Patent 2,699,396. While the wrap as described and claimed therein forms a particularly suitable product for use in connection with the present invention, wraps generally similar thereto, comprising plastic coated cloth wraps in which the plastic is perforated or otherwise treated to provide it with a substantial moisture vapor permeability, may be used if desired. The plastic may, for example, be made to form a porous coating on a substrate as described in U.S. Patent 2,618,580.

Wraps different from the above-discussed plastic-coated type may also be used, if desired. Desirably but not essentially, such wraps will tend to exclude air from the edible animal carcass surface, thereby tending to maintain the carcass surface in a moist state. Effectiveness of the antibiotic in suppressing the growth of noxious microorganisms on the edible animal carcass surface will be enhanced by the presence of moisture. In any case, the wrap will advantageously comprise an absorbent material. Absorbent materials are capable of wicking up moisture and distributing it evenly over the surface of the carcass. Moisture may be present at the carcass surface because of exudation or forcing out of moisture from the carcass during its initial cooling, and subsequently, because of condensation of moisture from the environment where the carcass is held. A wicking action of the wrap, such as that possessed by absorbent materials, produces a substantially uniform environment over the entire wrapped surface of the carcass, which is desirable.

The absorbent material can be either woven or non-woven. Where a woven construction is used, the cost will generally be minimized by selection of an open and loose construction, such as that of scrim or cheesecloth. Methods of construction like knitting or netting can also be used to form a suitable fabric. Non-woven wraps, such as paper, felts, webs, bats or the like, are generally the least expensive materials. To add strength, particularly to non-woven construction, the absorbent material may be reinforced with resins or plastics and the like. Any of a wide variety of fibrous substances may be selected to provide the absorbent material, such as paper, cotton, jute, ramie, rayon, worsted, and the like. Wraps made of non-absorbent materials like films of plastics, such as vinyl chloride or the like, may also sometimes be used. In such case, the non-absorbent material will be of such a construction that it is at least partially permeable to moisture vapor and air through perforations in the plastic film, for example.

The carcasses susceptible to treatment in accordance with the method of this invention to inhibit the development of fungi and bacteria on the exterior surfaces thereof are edible animal carcasses, by which is meant the carcases of four-footed mammals like beef, lamb, veal and pork. The term "carcass" will be understood to refer herein and in the claims to whole dressed carcasses and sides of such animals, such as whole dressed sides of beef, whole lamb, and whole or split-sides of veal, as well as to wholesale portions such as quarters, foresaddles and hindsaddles and primed cuts. The term "lamb" is used to include all sheep carcasses regardless of age or sex of the animal.

The animal may either be freshly slaughtered and skinned or the carcass may have been allowed to chill before skinning. The procedures employed in slaughtering houses for handling animal carcasses comprising different meats vary. Beef is skinned immediately after slaughtering. It is then split into sides, washed and wrapped in a wet shroud cloth. The beef carcass (two sides) wrapped in the wet shroud, is then placed in a cooler to chill. Veal, on the other hand, is often chilled with the hide on, and skinned subsequently. Lamb is usually hot-skinned, immediately after slaughtering, but in contrast to beef, it is not split into sides and may not be wrapped in a wet shroud during chilling.

The antibiotic can be positioned in moisture transfer contact relationship with the edible animal carcass either by applying the antibiotic to a wrap which is then applied to the carcass, or by applying the antibiotic to the edible animal carcass itself. In the latter case, upon covering the carcass surface with a wrap, if moisture is present, antibiotic will generally be transferred to the wrap to give substantially the same results as the first-stated procedure.

A convenient specific embodiment of the present invention comprises applying a wrap, such as the plastic-coated wrap discussed herein, moistened with an aqueous solution comprising an antibiotic, such as the solutions of a tetracycline antibiotic described above, to the edible animal carcass.

The amount of the aqeous solution comprising an antibiotic applied to the wrap will vary depending on the method of application which is to be used. When the wrap is applied to a warm, freshly killed carcass, which is generally the case with beef and lamb and may be the case with veal, the wrap is preferably saturated with the solution. On the other hand, if the carcass has been allowed to chill before skinning, as may be done with veal, the wrap is preferably applied in a damp condition after the excess solution has been removed by squeezing, wringing or hydroextraction. In other words, on cold carcasses a minimum moisture content is desirable, whereas on carcasses still retaining an appreciable amount of animal heat, a thoroughly wet wrap is preferred.

While it is possible to use a plastic-coated wrap of the character described by placing the plastic film in contact with the carcass surface, usually it will be the absorbent material surface which will be placed in contact with the carcass. This will give maximum effectiveness to the antibiotic in holding down the development of obnoxious microorganisms in the wrap and on the surface of the meat directly under and covered by the wrap.

The wrap moistened with the antibiotic should be applied to the skinned exterior surface of the animal carcass tightly and smoothly, to produce as intimate a contact as possible. It will be fastened to the carcass by such means as pins, sewed string stitches, string ties, thermoplastic seals, self-binding tape or the like.

If the animal carcass has not been chilled before the wrap is applied, the wrapped carcass will now be placed in a cooler. The cooler will generally have a temperature of about 30°–35° F. The carcass will be chilled in the cooler until body heat has been lost and the carcass has reached substantially the ambient temperature.

Whether applied before or after chilling, the plastic coated cloth may be maintained on the carcass during its entire period of handling, including shipping, marketing and holding by the retail meat dealer. The plastic coating will reduce weight losses and trimming losses. The wicking action of the cloth or other absorbent material will keep the surface of the meat in substantially uniform condition. The antibiotic present in the wrap and on the surface of the meat directly under and covered by the wrap will prevent the development of most bacteria, especially odor-forming and putrefactive bacteria. Thus a superior product with minimum losses in saleable weight and maximum keeping time will be obtained.

Substantially the same procedure as that described above may be used in applying wraps moistened with the antibiotic solution to the animal carcass when such wraps are of a construction different from that of the plastic-coated wrap referred to. Alternatively, particularly where the selected wrap has a low wet strength, it may be preferred to apply the wrap dry to the animal carcass. In such case, the antibiotic solution may, for example, be applied to surface of the edible animal carcass itself, after which the dry wrap is applied to the carcass. Another contemplated procedure comprises applying the wrap, generally in the dry state, to the animal carcass, and thereafter wetting the wrapped carcass with a solution of the antibiotic, spraying or painting the solution onto the wrap, for example. Where the wrap is constructed of an absorbent material like paper or has a permeable construction like that of a perforated plastic film, the antibiotic will thereby be brought into moisture transfer relationship with exterior surfaces of the carcass. In still another alternative procedure, the wrap may be impregnated with the antibiotic and thereafter applied in the dry state to the edible animal carcass. As has been mentioned hereinabove, fresh edible animal carcasses during chilling at temperatures above freezing exude or force moisture to the surface thereof. The animal carcass may also become moist subsequently because of condensation of moisture from the environment where it is held onto the surface thereof. By contact of such moisture with an initially dry wrap impregnated with the antibiotic, the antibiotic can be brought into contact with the carcass surface as required for the suppression of microorganism development at any point where the presence of moisture on the carcass surface offers opportunity for their growth. Similarly, because the stated factors produce moisture at the carcass surface, it is not essential that the antibiotic be in solution when it is applied to the animal carcass. It may, for example, be dusted onto the surface thereof, and maintained thereon by the protection against abrasion or the like given by covering the dusted carcass with a wrap.

A wrap applied to an edible animal carcass, when such carcass is the carcass of a whole animal or a side thereof, generally does not extend over the visceral cavity thereof. The visceral cavity offers an environment particularly favorable to the development of obnoxious microorganisms including the anaerobic odor-forming bacteria. It will therefore advantageously be protected in accordance with this invention by applying an antibiotic thereto, on the surfaces to which a wrap is not applied.

Application of a solution of the antibiotic to the edible animal carcass itself can be effected with economy by painting or wiping the surface of the carcass with the solution. When the carcass is not covered by an absorbent wrap which will wick up and produce an even distribution of moisture over the exterior surface thereof, it will be desirable to ensure that the carcass surface is substantially completely contacted with the solution. The carcasses of large mammals to the treatment of which this invention is directed cannot be dipped because of their weight and because their body fluids would contaminate a dip tank, but it is possible to obtain such substantially complete coverage by spraying. Generally, sufficient penetration will occur to maintain the antibiotic at the surface after the aqueous medium evaporates when solutions of antibiotic concentrations such as those mentioned above are used.

This invention is illustrated but not limited by the following examples.

*Example I*

A dip solution was prepared comprising 25 gallons of brine water (20° salometer). To this was added 100 g. of potassium sorbate to produce a concentration of 0.1% of the sorbate salt in the brine solution. Then 50 g. of a product comprising 20% oxytetracycline was added to the water to produce a concentration of 100 parts per million of the oxytetracycline in the dip water. The antibiotic product referred to is a preparation having a potency of 200 mcg./g., in which oxytetracycline is combined with citric acid to enhance its solubility.

The wraps used in this test are fabrics coated with a perforated plastic film, of the type described hereinabove. For the veal and lamb wraps, the cloth portion of the wrap is a 37-inch, 6.15-yard (2.5 ounces per square yard) fabric. The cloth base used for beef wraps is somewhat heavier. These fabrics are provided with a perforated coating of a vinyl resin plasticized with dioctyl phthalate. The coating on the heavier fabric weighs about 1.5 ounces per square yard. On the fabric of 2.5 oz./sq. yd. weight, the coating applied is more porous, and runs about 1.0 ounce per square yard for a veal wrap, and about 1.2 ounces per square yard for a lamb wrap.

Complete carcass wrappers were dipped in the above-described brine solution of potassium sorbate and oxytetracycline, and then applied to carcasses of beef, lamb and veal on the killing floor, immediately after the slaughtering and dressing operations. The wrapped carcasses were then placed in the cooler and held for a prolonged time, during which they were inspected periodically for appearance, condition, odor on the cloth and so forth. It was found that the carcasses wrapped in the antibiotic-containing meat wrap remained in good saleable condition throughout the period of inspection, whereas carcasses wrapped similarly but with wraps containing only brine would go off condition before the end of the period, developing odor, showing age and feeling sticky to the touch.

Similar results are obtained when chlortetracycline is substituted for the oxytetracycline.

*Example II*

Lamb carcasses were wrapped in the plastic-coated cloth described in Example I, dipped either in a tap water solution of oxytetracycline in the concentration of 100 parts per million, or in a tap water solution containing 100 parts per million of oxytetracycline and also 0.1% by weight of potassium sorbate. Control lambs were put up using plain water as the wrap dip. The lambs were placed in the cooler in the regular way and held there for six days, after which the cloths were removed and the carcasses were inspected for appearance, condition, odor on the cloth and so forth. The carcasses were found to be in excellent condition.

Four 5 cm. by 5 cm. sections were taken from different parts of each cloth and homogenized in a Lourdes disintegrator (total area of samples per cloth, 100 sq. cm.). The results of bacterial counts on the cloths were as follows.

| Treatment: | Number of bacteria, in millions/100 sq. cm. |
|---|---|
| Tap water | 670 |
| Aqueous solution of oxytetracycline | 71 |
| Aqueous solution of oxytetracycline and potassium sorbate | 4 |

*Example III*

To determine the amount of take-up of the antibiotic from the dip solution by the meat wrap, the following tests were conducted.

A lamb wrap 36 x 42¾" (1540 sq. inches, 9990 sq. centimeters) and a veal wrap 44 x 60½" (2670 sq. inches, 17,200 sq. centimeters), each of which was a plastic-coated cloth wrap as described in Example I, were weighed dry. They were then immersed in water and allowed to drain for five minutes and ten minutes, with the weights being taken at the five minute and ten minute intervals. Then the cloths were wrung out and again weighed. The following results were obtained.

| | Lamb Cloth, gram | Veal Cloth, gram |
|---|---|---|
| Dry Weight | 107 | 190 |
| 5 Min. Weight | 209 | 580 |
| 10 Min. Weight | 252 | 539 |
| Wrung-out Weight | 217 | 414 |

From the above figures it is apparent that the lamb cloth picks up a total of 110 g. in the wrung-out condition. Thus from a 100 part per million solution of oxytetracycline the cloth would pick up 11 mg. of the antibiotic. This is equivalent to 1.1 mcg. of oxytetracycline per square centimeter of surface.

The veal cloth, picking up a total of 224 g. of water, would contain 22.4 mg. of oxytetracycline as the pick-up from the 100 part per million oxytetracycline solution. This is equivalent to about 1.3 mcg. of oxytetracycline per square centimeter, which is about the same as for the lamb cloth.

Assuming a penetration of approximately ⅛ inch (⅓ cm.) into the meat surface contacted by the wrap and assuming 100% migration of the antibiotic from the cloth, at 1.1 mcg. of the antibiotic per square centimeter of cloth there would be a concentration of approximately 3.3 mcg. (3.3 p.p.m.) of oxytetracycline per gram of tissue. This is well below the permissible concentration level for oxytetracycline in food, and since the antibiotic would be entirely on the surface portion of the meat where it would be readily destroyed by cooking, it will be evident that the method of the invention can be used with complete safety for the consumer.

*Example IV*

A combination of an antifungal antibiotic and a wide-spectrum antibacterial antibiotic was employed in accordance with the present invention as follows.

An aqueous antibiotic solution was prepared containing 20 parts per million of oxytetracycline and 20 parts per million of nystatin.

The stated solution was applied to beef carcass sides (1) As a spray, applied directly on the carcass, and (2) As a dip bath for a plastic-coated cloth wrap, which in turn was applied to the carcass following the procedure described in Example I.

The treated beef carcasses were observed during an extended holding period at cooler temperatures of around 40° F. Fungus growth was significantly decreased as compared to untreated carcasses held similarly. Bacterial growth was also suppressed.

While the invention has been described with particular reference to various specific embodiments thereof it will be appreciated that modification and variations can be made within the scope of the invention and the appended claims.

What is claimed is:

1. In the treatment of a skinned edible carcass of a four footed mammal involving applying to said carcass a permeable, woven wrap moistened with an aqueous brine solution, the improvement which comprises the step of including in said brine solution an antibiotic in a concentration, equivalent to between about 10 and about 500 parts per million of oxytetracycline hydrochloride having a potency of approximately 795 mcg./g., sufficient to inhibit the development of obnoxious microorganisms, including odor-forming bacteria, on the surface of said carcass.

2. The method according to claim 1 wherein said wrap is adapted to remain on the carcass for prolonged periods of time and said woven wrap is plastic coated and has an absorbent side, said plastic coating being a substantially continuous moisture vapor permeable, pliable, water resistant film.

3. The method of claim 1 wherein said antibiotic comprises a tetracycline antibiotic.

4. The method of claim 3 wherein said tetracycline antibiotic is oxytetracycline.

5. The method of claim 3 wherein said tetracycline antibiotic is chlortetracycline.

6. The method of claim 1 wherein there is also included in said brine solution a mold inhibitor in an amount sufficient to inhibit the development of mold on the surface of the carcass.

7. The method of claim 4 wherein there is also included in said brine solution potassium sorbate in an amount sufficient to inhibit the development of fungi on the carcass surface.

8. The method of claim 1 wherein said antibiotic is a combination of an antifungal antibiotic and a broad spectrum antibacterial antibiotic.

9. The method of claim 8 wherein said antifungal antibiotic is nystatin and said broad spectrum antibacterial antibiotic is oxytetracycline.

References Cited in the file of this patent

UNITED STATES PATENTS

| | | |
|---|---|---|
| 2,697,664 | Goeser et al. | Dec. 21, 1954 |
| 2,858,225 | Gooding et al. | Oct. 28, 1958 |
| 2,866,708 | Broquist et al. | Dec. 30, 1958 |
| 2,906,646 | Smith et al. | Sept. 29, 1959 |
| 2,942,986 | Williams | June 28, 1960 |
| 2,944,907 | Pagano et al. | July 12, 1960 |

OTHER REFERENCES

"Modern Meat Packaging Practices," new third ed., Nov. 24, 1956, pages 29 to 35, inclusive, article entitled Antibiotic Introduced as Spoilage Inhibitor for Fresh Poultry, by W. H. Miller.

"Foods," May 1959, page 189, article entitled Soluble Sorbate Inhibitor.